US012720133B2

(12) United States Patent
Bastable et al.

(10) Patent No.: US 12,720,133 B2
(45) **Date of Patent: *Aug. 25, 2026**

(54) SYNCHRONIZED INTERLEAVED WATERMARKING

(71) Applicant: Synamedia Limited, Staines Upon Thames (GB)

(72) Inventors: Ian John Bastable, Hampshire (GB); James Leigh Cunningham, Hampshire (GB); Gwenaël Jacques Doërr, Rennes (FR); Michal Irit Devir, Haifa (IL); Alla Mikhlin, Kedar (IL); Anatoly Seldin, Jerusalem (IL); Max Sorkin, Mevaseret Zion (IL)

(73) Assignee: Synamedia Limited, Maidenhead (GB)

( * ) Notice: Subject to any disclaimer, the term of this patent is extended or adjusted under 35 U.S.C. 154(b) by 230 days.

This patent is subject to a terminal disclaimer.

(21) Appl. No.: 18/198,484

(22) Filed: May 17, 2023

(65) Prior Publication Data

US 2024/0388749 A1 Nov. 21, 2024

(51) Int. Cl.
*H04N 21/2389* (2011.01)
*H04N 21/242* (2011.01)
*H04N 21/266* (2011.01)

(52) U.S. Cl.
CPC ..... *H04N 21/23892* (2013.01); *H04N 21/242* (2013.01); *H04N 21/26606* (2013.01)

(58) Field of Classification Search
CPC ........... H04N 21/8358; H04N 21/2365; H04N 21/23892; H04N 21/2347;
(Continued)

(56) References Cited

U.S. PATENT DOCUMENTS 10,045,040 B2 8/2018 Wachtfogel et al.
10,848,777 B2 * 11/2020 Wachtfogel .......... H04N 19/467
(Continued)

FOREIGN PATENT DOCUMENTS

WO WO-2013060390 A1 * 5/2013 ....... H04N 21/23439

OTHER PUBLICATIONS

Combined Search and Examination Report under Sections 17 and 18(3) dated Dec. 12, 2024, Great Britain Application No. GB2405491.8, pp. 1-10.

*Primary Examiner* — Jason Salce
(74) *Attorney, Agent, or Firm* — Fernando & Partners, LLP

(57) ABSTRACT

Techniques for synchronized interleaved watermarking are described. In various embodiments, a headend provisions control words (CWs), generates entitlement control messages (ECMs) for producing the CWs, where each of the ECMs is associated with a watermark identifier (WMID) symbol index assigned to a watermark cryptoperiod, moves portion(s) from a video stream to auxiliary streams, generates versions of the portion(s) to embed watermark symbols within the watermark cryptoperiod, where each version represents a respective watermark symbol, and encrypts the versions using the CWs at start of the watermark cryptoperiod. On the client side, a client device storing a WMID obtains the video and encrypted auxiliary streams and the ECMs referencing the WMID symbol index and selects and decrypts an auxiliary stream using a CW during the watermark cryptoperiod based on the respective watermark symbol, the WMID symbol index, and the WMID before re-multiplexing the video and auxiliary streams for rendering.

12 Claims, 9 Drawing Sheets

(58) Field of Classification Search
CPC ....... H04N 21/26606; H04N 21/23439; H04N 21/236; H04N 21/23895
See application file for complete search history.

(56) References Cited

U.S. PATENT DOCUMENTS

| | | | | |
|---|---|---|---|---|
| 2009/0323949 | A1* | 12/2009 | Chieze | H04N 21/26613 380/239 |
| 2018/0184160 | A1 | 6/2018 | Cain et al. | |
| 2018/0295376 | A1 | 10/2018 | Wachtfogel et al. | |
| 2019/0335213 | A1 | 10/2019 | Bieber | |
| 2022/0351324 | A1 | 11/2022 | Kuznetsov et al. | |
| 2023/0109439 | A1 | 4/2023 | Tamir et al. | |

* cited by examiner

SYNCHRONIZED INTERLEAVED WATERMARKING

TECHNICAL FIELD

The present disclosure relates generally to systems, devices, and methods for media content watermark embedding and, more specifically, to interleaved watermarking of media content.

BACKGROUND

Headend-based watermarking has certain advantages over client-side watermarking in terms of security. For instance, headend-based watermarking can be deployed in over-the-top (OTT) environments to avoid integrating security-sensitive components into a large number of client devices, where the integration on the client side can be difficult to secure. Nevertheless, in broadcast or multicast environment, where the same signal is delivered to many clients, it is difficult to implement pure headend-based watermarking solutions to generate unique watermarked outputs for each client.

Some previously existing headend-based watermarking solutions add video streams that include pre-watermarked information. Using the pre-watermarked information, a client can assemble different parts of the streams to produce a unique video output. In such solutions, the assembly process is often enforced by distributing a sequence of entitlement control messages (ECMs) to each client for producing a unique set of control words (CWs). This allows tracing the leakage source by examining the unique watermark embedded in the unique output in case of the unique output being shared during a breach. However, such solutions do not address synchronization challenges between the watermarking and ECM engines, such as synchronizing transition points and assigning watermark bit(s) for each watermarked video section. Moreover, the communication of the start codes and/or framing may introduce significant overhead when start codes and/or framing are used for notifying the transition points.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
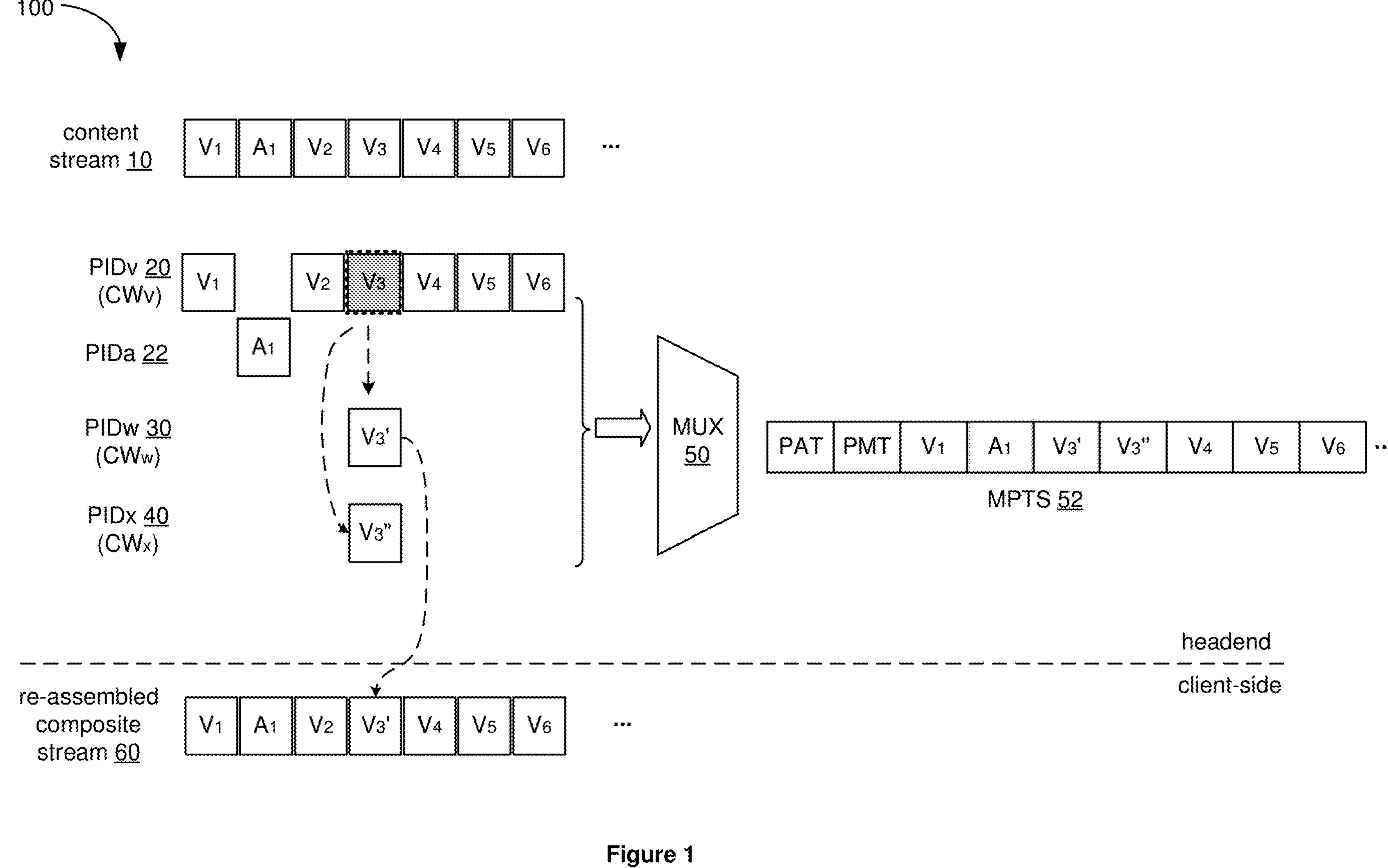
FIG. 1 is a diagram illustrating interleaved watermarking, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Described herein are methods, devices, and systems that address the aforementioned challenges in previously existing headend-based watermarking solutions. In some embodiments, at the headend, a watermark (WM) inserter and an entitlement control message generator (ECMG) synchronize the assignment of watermark identifier (WMID) symbols. In some embodiments, to synchronize a particular WMID symbol index, the WM inserter signals to the ECMG which WMID symbol index has been assigned to the current watermark cryptoperiod (CP). Through the entitlement control messages (ECMs) generated by the ECMG, the watermark cryptoperiod information is then cascaded to the client side so that a demultiplexer on a client device is aligned with the WM inserter pace making. Moreover, in some embodiments, for client devices supporting personal video recorder (PVR) or home gateway capabilities, a watermarked embedded auxiliary stream that is selectively decrypted during each watermark cryptoperiod is re-multiplexed with the video stream to feed both a live viewing pipeline and a playback pipeline. The simultaneous feeding ensures that the watermark is present in both live and playback pipelines to protect the content from tampering. Accordingly, through the synchronization of the WMID symbol assignment and the signaling of the watermark cryptoperiod information, the methods, devices, and systems described herein enhance content protection while avoiding the communication of start codes and/or framing to reduce the watermarking overhead.

In accordance with various embodiments, a method is performed at a server including one or more processors and a non-transitory memory. The method includes provisioning multiple control words used in a watermark cryptoperiod.

The method further includes generating multiple entitlement control messages for producing the multiple control words, where each of the multiple entitlement control messages is associated with a watermark identifier symbol index assigned to the watermark cryptoperiod. The method additionally includes moving one or more portions from a video stream to multiple auxiliary streams and generating multiple versions of the one or more portions to embed watermark symbols within the watermark cryptoperiod, where each of the multiple versions is associated with a respective one of the watermark symbols. The method also includes encrypting the multiple versions using the multiple control words at start of the watermark cryptoperiod.

In accordance with various embodiments, a method is performed at a client device including a processor and a non-transitory memory storing a watermark identifier. The method includes obtaining a video stream, multiple auxiliary streams encrypted with multiple control words, and multiple entitlement control messages referencing a watermark identifier symbol index associated with a watermark cryptoperiod, where a respective one of the multiple entitlement control messages enables producing a respective one of the multiple control words for decrypting a respective one of the multiple auxiliary streams during the watermark cryptoperiod. The method further includes decrypting an auxiliary stream selected from the multiple auxiliary streams using a control word of the multiple control words during the watermark cryptoperiod, where the auxiliary stream is selected based on a respective watermark symbol associated with the auxiliary stream, the watermark identifier symbol index, and the watermark identifier. The method additionally includes re-multiplexing the video stream and the auxiliary stream to generate a composite stream for rendering.

Example Embodiments

Interleaved watermarks are forensic watermarks that include a payload unique to an end-user device and/or a user. Interleaved watermarks are inserted on the server side, e.g., at the headend, so that content arrives at each client with the watermark signal in the content. Relative to client-side watermarking, interleaved watermarking at the headend is more secure. For example, FIG. 1 is a diagram 100 illustrating interleaved watermarking. In FIG. 1, a content stream 10 includes a plurality of transport packets (TPs) carrying video data and audio data, e.g., TPs in a video stream 20 with a packet identifier (PID) value of PIDv carrying video data including $V_1$, $V_2$, $V_3$, $V_4$, $V_5$, $V_6$, etc. and an exemplary TP in an audio stream 22 with PIDa carrying audio data including $A_1$, etc. As will be described in further detail below, a watermark inserter on the headend side identifies locations in the video stream 20 where watermarks can be introduced, e.g., by profiling the video stream 20. The watermark inserter then allocates watermarks to encode a symbol of a watermark identifier (WMID) (e.g., a WMID bit) at each of the identified locations when performing the embedding step.

In particular, when profiling the video stream 20, the watermark inserter inspects the video stream 20 to identify locations where changes can be introduced and which alternative value to use. In some embodiments, the result of profiling is conveyed and/or packaged as watermark metadata (or a profile) to be used further down the content delivery pipeline, e.g., used by the watermark inserter when performing the embedding step. In some embodiments, content-aware watermark metadata generated by the watermark inserter specify where the media content can be modified, which alternate values can be placed at these locations, and which sequence of modifications would be applied to encode the watermark information.

For instance, the watermark metadata generated in the profile step can include a list of (offset, original_value, alternate_value) triplets, where the offset specifies the location within the content, and original_value and alternate_value are values that can be placed interchangeably at the offset without introducing visible artifacts while being detectable. In another example, to specify a rule of performing four changes per watermark identifier bit, the watermark metadata specify applying {(offset_1, original_value), (offset_2, alternate_value), (offset_3, alternate_value), (offset_4, original_value)} to embed a WMID bit that equals to 0 and applying {(offset_1, alternate_value), (offset_2, original_value), (offset_3, original_value), (offset_4, alternate_value)} to embed a WMID bit that equals to 1. In some embodiments, the watermark inserter groups several modification tuples and defines antipodal sequences, such as {original_value, alternate_value, alternate_value, original_value} and {alternate_value, original_value, original_value, alternate_value}, that would be applied at locations {offset_1, offset_2, offset_3, offset_4} to encode a watermark bit equal to 0 and 1, respectively. It should be noted that the terms "WMID bit" and "WMID symbol" are used interchangeably as used herein. Likewise, the terms "WMID bit index" and "WMID symbol index" are used interchangeably as used hereinafter. In the example described above, a WMID symbol or a WMID bit can be 0 or 1. In another example, a WMID symbol can be one of the alphabet.

In some embodiments, when performing the embedding step, the watermark inserter generates multiple versions of portions of the video stream 20 according to the metadata and applies the watermarks in the multiple versions according to the metadata. For example, in FIG. 1, the watermark inserter generates two pre-watermarked versions of the video stream 20 spanning the watermarks, e.g., two auxiliary streams 30 and 40 with the stream 30 having packet $V_3'$ and the stream 40 having packet $V_3''$, e.g., $\{V_3', V_3''\}=f\{V_3\}$. Due to the minimal length of a watermark, a limited number of TPs differ between the two versions. In other words, a reduced set of TPs can be created at the headend such that one is for a first watermark bit value, e.g., 0, and the other is for a second watermark bit value, e.g., 1, to convey the watermark information. In some embodiments, the TPs present in the reduced set, e.g., $V_3$, are stripped from the video stream 20, whereas the pre-watermarked versions are placed on two additional PIDs, e.g., the auxiliary stream 30 with PIDw and the auxiliary stream 40 with PIDx.

In some embodiments, the auxiliary streams are provided to a multiplexer 50 and the multiplexer 50 multiplexes the video and audio streams 20 and 22 to form a multiplexed stream. For example, an exemplary multiplexed stream can be a MPEG multi-program transport stream (MPTS) 52, which includes packets for signalization, such as a program association table (PAT) and a program map table (PMT) as specified by MPEG, followed by packets from the streams 20-40. The PAT has a list of programs and the corresponding PMT PIDs. The PMT is associated with each channel and/or service to show details about a respective PID and their respective types, e.g., indicating the PID of a transport stream (TS) packet carrying an image, audio data, private data, or the like. As shown in FIG. 1, though the inclusion of the streams 30 and 40 introduces overhead, a limited number of TPs carrying $V_3'$ and $V_3''$ differ between the two versions 30 and 40. As such, the overhead introduced by the transmission of the auxiliary streams 30 and 40 is significantly lower than duplicating the video stream 20.

In conditional access (CA) systems, streams are encrypted using control words (CWs) and sequences of entitlement control messages (ECMs) are distributed to each client for producing a unique sequence of CWs. In the example shown in FIG. 1, the video stream 20 is encrypted with a control word (CW) that is different from the CWs for encrypting the auxiliary streams 30 and 40, e.g., CWv being different from CWw and CWx. In some embodiments, for watermarking, the watermark inserter assigns a WMID symbol index to the reduced set of TPs carrying $V_3$' and $V_3$". In some embodiments, for synchronizing the watermark pace making, as will be described in further detail below, ECMs for the auxiliary streams 30 and 40 indicating which bit of the WMID would be embedded for each watermark cryptoperiod are distributed to the client devices. Additionally, in some embodiment, each of the auxiliary streams 30 and 40 is associated with a preset or predefined WMID symbol, e.g., the auxiliary stream 30 being associated with WMID bit (and the auxiliary stream 40 being associated with WMID bit 1. The synchronization between the watermarking and ECM engines for each cryptoperiod is thus critical to the interleaved watermarking system so that the watermark inserter can move from one symbol (or one unit) of the WMID to another and so that, during each watermark cryptoperiod, the same symbol index is conveyed simultaneously on PIDw and PIDx.

On the client side, in some embodiments, to embed payloads unique to the client, the client device decrypts one of the two auxiliary streams 30 and 40 in each watermark cryptoperiod and performs an interleave operation by interleaving (e.g., concatenating) different portions from the two auxiliary streams 30 and 40 with the video stream 20 and the audio stream 22. A re-assembled composite stream 60 is thus the concatenation of the video stream 20 and the audio stream 22 with different selections from the auxiliary streams 30 and 40. In particular, one of the auxiliary streams 30 and 40 is interleaved with the video stream 20 and the audio stream 22 every watermark cryptoperiod, e.g., concatenating $V_1$, $A_1$, $V_2$, $V_4$, $V_5$, $V_6$ of the video stream 20 with $V_3$' from the auxiliary stream 30 during one watermark cryptoperiod and concatenating packets from the video and audio streams 20 and 22 with a different packet selected from the auxiliary stream 40 during a different watermark cryptoperiod (not shown). Since the choice of which CWs are produced during each cryptoperiod is determined based on a client ID associated with each client, different watermark embedded composite streams are generated by the interleave operation described herein at different client devices to uniquely identify each client for content protection. As used herein, a client ID is also referred to a watermark ID or a WMID.

Also on the client side, as will be described in further detail below, in some embodiments, a CA unit, including a watermark controller on the client device, facilitates the decision of whether to produce a CW for decrypting the auxiliary stream 30 or 40 based on which bit of a client ID would be embedded, the watermark symbols associated with the auxiliary streams 30 and 40, and the WMID symbol index signaled through the ECMs for each watermark cryptoperiod. In the example shown in FIG. 1, the CA unit receives an ECM corresponding to the stream 30 with PIDw, identifies a corresponding watermark cryptoperiod to which the WMID symbol index is assigned to based on the ECM, and produces CWw for decrypting the packet carrying $V_3$' during the identified watermark cryptoperiod for a WMID bit value corresponding to the stream 30 with PIDw. As such, through ECM signaling, the synchronization of the WMID bit index with the watermark cryptoperiod is cascaded to the client side, so that the decryption, demultiplexing, and/or re-multiplexing on the client side are aligned with the watermark pace making by the watermark inserter on the server side.

Though FIG. 1 illustrates TPs carrying video and/or audio data for watermark embedding, various levels of granularity for watermarking can be implemented in the system described herein. In some embodiments, the granularity is at the watermark level, e.g., 2 bytes long. In some embodiments, the granularity is at the transport packet level, e.g., 188 bytes long at the MPEG2-TS video transport layer as shown in FIG. 1. In some embodiments, the granularity is at the watermark cryptoperiod level, e.g., a few seconds imposed by the watermarking system to account for the fact that several marks are needed to encode a single bit of watermark information. Without interleaved watermarking, very large modifications (e.g., a full frame) would have to be modified for watermark embedding and watermarking of other frames in a group-of-pictures (GOP) would have to be turned off to keep the bandwidth overhead under control. Interleaved watermarking thus enables smaller changes, e.g., at TP level, to significantly reduce the watermark overhead.

In FIG. 1, the video stream 20 alone cannot be used to render an output on the client side without the TP(s) from either the auxiliary stream 30 or 40 during each watermark cryptoperiod. Further, the inclusion of the watermark embedded TP(s) from either the auxiliary stream 30 or 40 in the composite stream 60 protects the content from tampering. Additionally, in some embodiments, the interleaved watermarking illustrated in FIG. 1 can be further adapted to cryptoperiods without watermarking for tamper protection. For instance, when watermarks cannot be embedded in a particular watermark cryptoperiod, certain parts of the video that are essential for viewing, e.g., TP(s) carrying a portion of an I-frame, are moved from PIDv to both auxiliary streams 30 and 40. In such embodiments, the watermark inserter randomly selects PIDw or PIDx and notifies the entitlement control message generator (ECMG) about the selection of PIDw or PIDx for the particular watermark cryptoperiod, so that ECMs are provided to the client for decrypting the corresponding auxiliary stream. This enforces the client to employ either one of the auxiliary streams 30 and 40 when re-assembling the composite stream 60 for rendering, thus preventing an attack on the client during cryptoperiods that do not have any embedded watermark.

Figure 2:
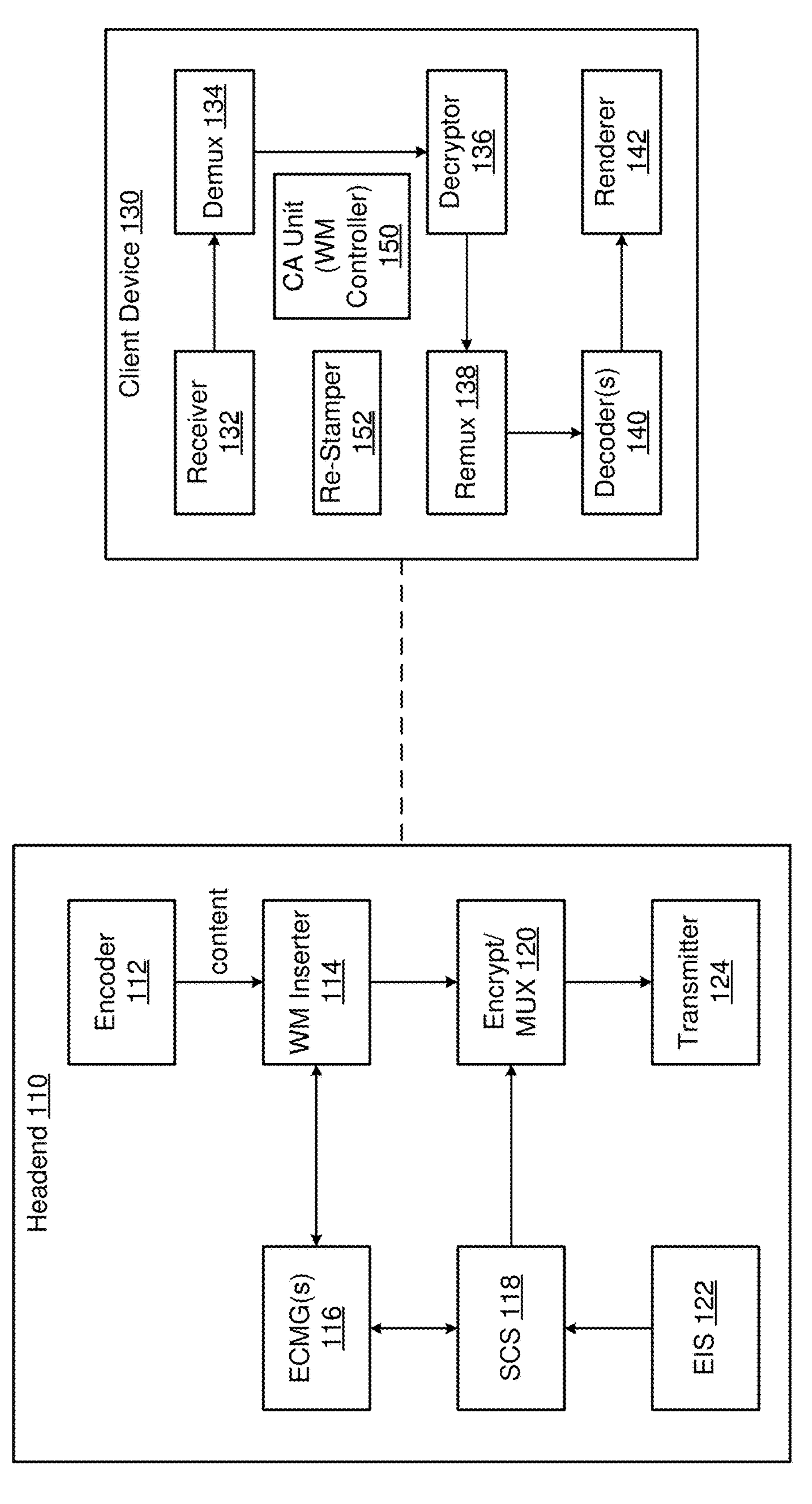
FIG. 2 is a block diagram illustrating an exemplary multimedia content delivery system performing synchronized interleaved watermarking, in accordance with some embodiments.

Reference is now made to FIG. 2, which is a block diagram of an exemplary multimedia content delivery system 200 performing synchronized interleaved watermarking in accordance with some embodiments. In some embodiments, the exemplary system 200 includes an exemplary headend 110 on the server side, e.g., hosted by one or more servers in the cloud and/or in private premises, and an exemplary client device 130 on the client side, e.g., a set-top-box. In some embodiments, the headend 110 obtains multimedia content (also referred to hereinafter as the media content, the content, or the asset) from various sources, and delivers it to various types of client device 130 via various types of media delivery mechanisms. For example, the multimedia content can include audio, video, and the like and can be live or on-demand streaming content. In another example, the content can be delivered via any type of content delivery system, such as cable, satellite, cellular/ wireless, broadcast, multicast, Internet/IP, and/or any other content delivery technology or system currently known or hereafter developed. In yet another example, the client device 130 can be a set-top-box or a receiver and/or a computing device being connected or integrated with a television or a display. The techniques discussed herein additionally can be extended to a variety of other electronic devices, display devices, or combined devices, such as computers, tablets, mobile devices, media players, and the like. A person of ordinary skill in the art will recognize various alterations, additions, omissions, and substitutions.

In some embodiments, the headend 110 includes components in the standard digital video broadcast (DVB) simulcrypt architecture, e.g., a control word generator (CWG) (not shown), one or more entitlement control message generators (ECMGs) 116, a simulcrypt synchronizer (SCS) 118, an encryptor and multiplexer unit 120 (e.g., including the multiplexer 50 in FIG. 1), an event information scheduler (EIS) 122, and a transmitter 124. Additionally, in some embodiments, the headend 110 includes an encoder 112 and a watermark inserter 114. In some embodiments, the encoder 112 is operative to receive and encode content into content stream(s), e.g., the video stream 20 and the audio stream 22 in FIG. 1. Though FIG. 2 illustrates the watermark inserter being coupled to the encoder 112, the stream(s) received by the watermark inserter 114 can be in an encoded state or a non-encoded state, e.g., a raw state.

In some embodiments, the watermark inserter 114 is operative to receive the stream(s) from the encoder 112 and generate auxiliary streams for embedding watermark symbols, e.g., the auxiliary streams 30 and 40 shown in FIG. 1. Further, in some embodiments, the watermark inserter 114 facilitates headend-based interleaved watermarking. To facilitate interleaved watermarking, in some embodiments, the watermark inserter 114 receives a content stream from the encoder 112 (e.g., the video stream 20 shown in FIG. 1) and generates multiple pre-watermarked versions of a portion of the video stream as the auxiliary streams. In some embodiments, each of the auxiliary streams is encrypted with a different CW by the encryptor and multiplexer unit 120. In some embodiments, the content stream is encrypted with a different CW, and the encryptor and multiplexer unit 120 multiplexes the encrypted content stream with the auxiliary streams provided by the watermark inserter 114. The transmitter 124 then transmits the multiplexed encrypted stream to the client device 130, e.g., via broadcast or multicast. For instance, the transmitter 124 can includes a modulator operative to modulate a radio frequency (RF) carrier based on a transport stream and transmits the modulated carrier via satellite transponders to broadcast the signal.

In addition to transmitting the multiplexed encrypted stream, the headend 110) also sends ECMs generated by the ECMG(s) 116 via the transmitter 124 in accordance with some embodiments. The ECMs include information for producing the CWs that are used by the client device 130 for decryption. In the DVB simulcrypt architecture, the EIS 122 holds schedule information, configurations, and conditional access specific information. For instance, the EIS 122 provides any information necessary for generating ECMs to the ECMG(s) 116 through the SCS 118. To relay the information, the SCS 118 establishes and manages channels and connections with the ECMG(s) 116. Additionally, the SCS 118 obtains CWs from the CWG, supplies the CWs to the ECMG(s) 116 on relevant streams, and provides the CWs to the encryptor and multiplexer unit 120 for use in a particular crypto period. Furthermore, the SCS 118 synchronizes the ECMs from the ECMG(s) 116 with their associated crypto periods according to channel parameters and submits the ECMs to the encryptor and multiplexer unit 120 to request their repetition according to the channel parameters.

On the client side, the exemplary client device 130 includes a receiver 132, a demultiplexer 134, a decryptor 136, a re-multiplexer 138, one or more decoders 140, a renderer 142, a CA unit including a watermark controller 150, and a re-stamper 152 in accordance with some embodiments. The receiver 131 (e.g., a tuner and a demodulator) is operative to receive a carrier signal carrying multiplexed stream(s) from the headend 110 and extract the streams from the carrier signal. The demultiplexer 134 is operative to demultiplex the multiplexed streams to obtain video streams, audio streams, as well as auxiliary streams. In some embodiments, the watermark controller of the CA unit 150 derives ECMs for the auxiliary streams and provides CWs to the decryptor 136, which then uses the CWs for decrypting the demultiplexed streams. In addition to providing CWs, in some embodiments, the watermark controller of the CA unit 150 is operative to select one of the auxiliary streams to be decrypted and combined with the video streams for rendering. In some embodiments, the decrypted streams are then re-multiplexed by the re-multiplexer 138 to generate a composite stream, e.g., the composite stream 60 shown in FIG. 1 and/or a single program transport stream (SPTS), which is further filtered and decoded by the decoder(s) 140 before being rendered by the renderer 142. In some embodiments, when re-multiplexing the streams, the re-stamper re-stamps the PIDs of packets from the auxiliary stream to the PID of the video stream as part of the re-multiplexing, so that the order of the packets received in the multiplexed stream is preserved in the composite stream, e.g., maintaining the timestamps of the packets for presentation and/or decoding.

It should be noted that the exemplary system 200 is by way of example. Components on the one or more servers hosting the headend 110 can be combined or separated, can be executed by one or more processors, and/or can be co-located on one server or distributed over multiple servers. Likewise, the client device 130 can include different and/or additional components as will be shown in FIGS. 4 and 5A-5B and described in further detail below: Further, each component can have multiple instances. For example, the client device 130 can have more than one instance of the demultiplexer 134, e.g., one for demultiplexing MPTS and another one for demultiplexing SPTS. In another example, the decoder 140 can have multiple instances, e.g., one for decoding audio data and another one for decoding video data. In yet another example, multiple instances of the ECMG(s) 116 can be configured so that different ECMGs generate different ECMs for different streams, e.g., ECMG-v for the video stream, ECMG-w for the auxiliary stream with PIDw, and ECMG-x for the auxiliary stream with PIDx. For the sake of simplicity, the subject matter will be described hereinafter for the most part with reference to a single instance.

It should also be noted that the one or more physical components may comprise hard-wired or programmable devices, or a combination of the two. In some embodiments, at least some of the functions of the processing circuitry may be carried out by a programmable processor under the control of suitable instructions. The instructions may be downloaded to a device in electronic form, over a network, for example. Alternatively or additionally, the instructions may be stored in tangible, non-transitory computer-readable storage media, such as optical, magnetic, or electronic memory. For instance, each of the one or more servers hosting the headend 110 may include one or more processors and a non-transitory memory. Likewise, in another example, the client device 130 may include a processor and a non-transitory memory that stores a watermark identifier. It is appreciated that instructions may, if desired, be implemented in ROM (read only memory) form. The instructions may, generally, be implemented in hardware, if desired. It is further appreciated that the instructions may be instantiated, for example: as a computer program product or on a tangible medium. In some cases, it may be possible to instantiate the instructions as a signal interpretable by an appropriate computer, although such an instantiation may be excluded in certain embodiments of the present disclosure.

Figure 3:
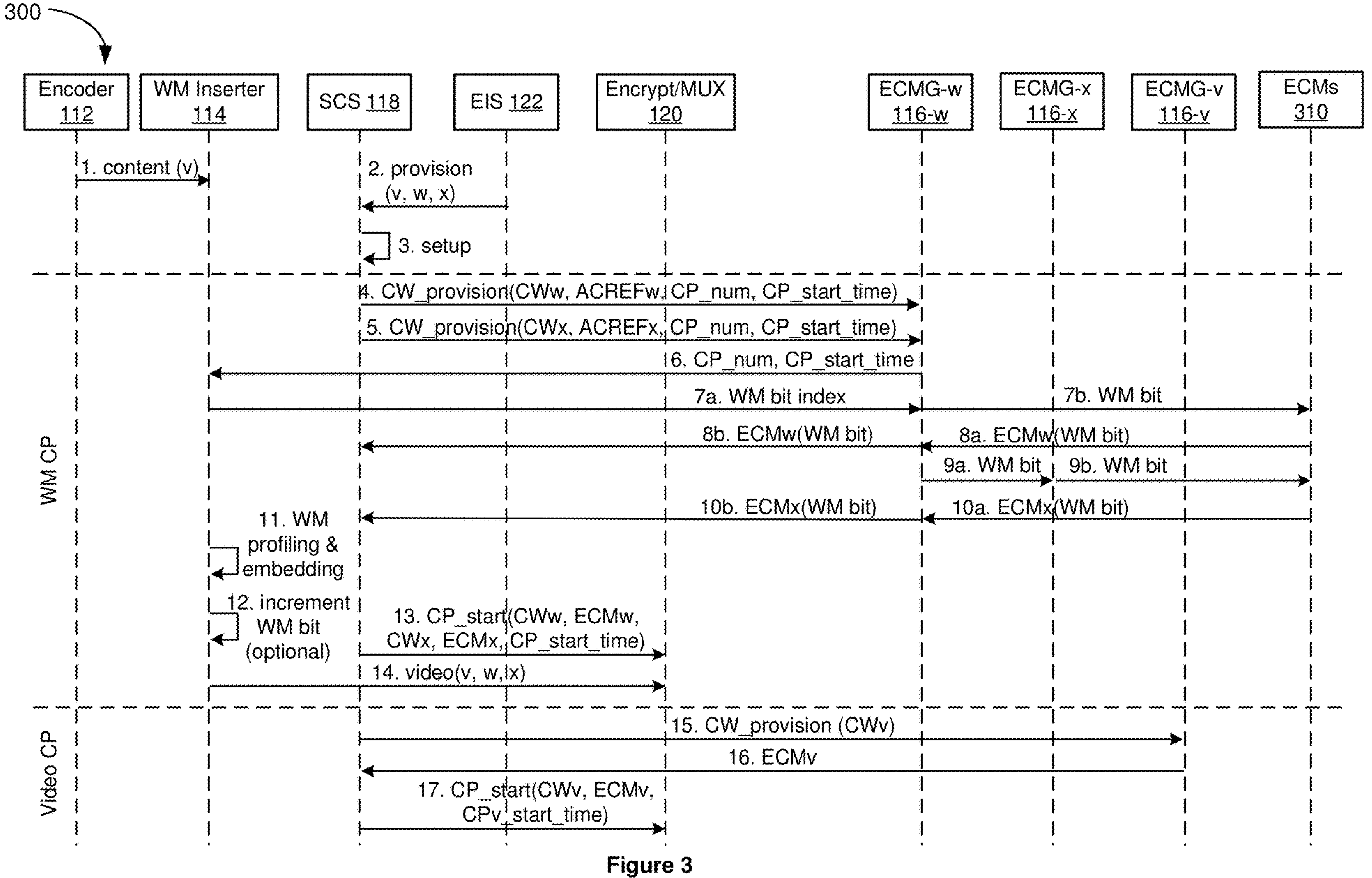
FIG. 3 is a sequence diagram illustrating an interleaved watermarking process with synchronization at the headend, in accordance with some embodiments.

FIG. 3 is a sequence diagram illustrating an interleaved watermarking process 300 with synchronization at the headend 110 (FIG. 2) in accordance with some embodiments. In some embodiments, as described above with reference to FIG. 2, the watermark inserter 114 is coupled with the encoder, so that in step 1 of the interleaved watermarking process 300, the watermark inserter 114 receives a content stream (denoted as v) from the encoder 112, e.g., the video stream 20 in FIG. 1. In step 2 and 3 of the process 300, as in the standard DVB simulcrypt architecture, the EIS 122 provides to the SCS 118 information related to the provisioning of ECMs corresponding to the video stream as well as auxiliary streams (denoted as w and x), e.g., the auxiliary streams 30 and 40, so that the SCS 118 can set up the channels and connections with the ECMGs 116-*w*, 116-*x*, and 116-*v* to relay the information from the EIS 122 in step 3.

For each watermark cryptoperiod related to the crypto operations on the auxiliary streams, the process 300 includes steps 4 through 14. In contrast, for each cryptoperiod related to the crypto operations on the video stream, the process 300 includes steps 15 through 17. In some embodiments, the watermark cryptoperiod is independent of the video cryptoperiod. As such, it is important to communicate and signal the start of each type of cryptoperiod for synchronized interleaved watermarking.

In some embodiments, in steps 4 and 5, the SCS 118 sends CW provision messages to the ECMG-w 116-*w* (e.g., an ECMG for the auxiliary stream 30 in FIG. 1) and to the ECMG-x 116-*x* (e.g., an ECMG for the auxiliary stream 40 in FIG. 1). In some embodiments, in the CW provision messages, the SCS 118 specifies the watermark cryptoperiod information. For example, in step 4, the provision message for CWw includes the watermark cryptoperiod identifier (denoted as CP_num), the watermark cryptoperiod start time (denoted as CP_start_time), and access criteria (denoted as ACREFw or ACw), among others. Likewise, in step 5, the provision message for CWx includes the watermark cryptoperiod identifier CP_num, the watermark cryptoperiod start time CP_start_time, and access criteria denoted as ACREFx or ACx, among others. For example, ACw can specify that the ECM signaling for PIDw is for WMID bit value of 0, e.g., ACw=F (WM_ID_bit=0). In another example, ACx can specify that the ECM signaling for PIDx is for WMID bit value of 1, e.g., ACx=F(WM_ID_bit=1).

In step 6, the ECMG-w 116-*w* notifies the watermark inserter 114 about the watermark cryptoperiod start time for the upcoming watermark cryptoperiod. In step 7*a*, in response to receiving the notification from the ECMG-w 116-*w*, the watermark inserter 114 signals to the ECMG-w 116-*w* which WMID bit index has been assigned to the current watermark cryptoperiod. The watermark bit index assignment to the current watermark cryptoperiod is then cascaded to the client through ECMs 310 so that the demultiplexing on the client side is aligned with the watermark pace making by the watermark inserter 114.

In some embodiments, the WMID bit index determination or calculation in step 7*a* is incremental, e.g., WMID_bit_index=(WMID_bit_index+1) % WMID_length, where WMID_length is the length of the watermark symbols used to encode the WMID. For example, when an exemplary WMID is 0x01100011, the length of the watermark symbols used to encode the WMID is 8, i.e., WMID_length=8. For successive watermark cryptoperiods, applying the WMID bit index assignment function described above, a possible sequence of WMID symbol index is {0, 1, 2, . . . , 7, 0, 1, . . . }. In some embodiments, to avoid stateful information in the headend, the WMID symbol index is derived from a timestamp associated with the watermark cryptoperiod, e.g., the start time of the respective watermark cryptoperiod, and a duration of the watermark cryptoperiod, e.g., WMID_symbol_index=floor (CP_start_time/CP_duration) % WMID_length.

As shown in FIG. 3, the interactions among the SCS 118, the ECMG-w: 116-*w*; and the watermark inserter 114 in steps 4 through 7*a* make the watermarking system aware of the beginning of a new watermark cryptoperiod, which is associated with embedding a watermark symbol in a new portion of the video stream, e.g., TP(s), byte(s), and/or seconds associated with the video stream. In particular, once the watermark inserter 114 signals to the ECMG-w 116-*w* which WMID bit index has been assigned to the current watermark cryptoperiod in step 7*a*, the ECMGs 116-*w* and 116-*x* generate respective ECMs 310 that address the respective WMID bit, e.g., ECMw for the stream with PIDw addressing WMID bit value of 0 and ECMx for the stream with PIDx addressing WMID bit value of 1. Further, in steps 11 and 12, the watermark inserter 114 performs watermark profiling and embedding as well as optionally incrementing the watermark bit index. Once the watermark symbol has been embedded and the ECMs 310 are prepared, in step 13, the SCS 118 signals the encryptor and multiplexer unit 120 to start the watermark cryptoperiod, and in step 14, the watermark inserter 114 signals the encryptor and multiplexer unit 120 to encrypt and multiplex the streams v, w, and x. In some embodiments, the signaling in step 13 includes CWw, ECMw, CWx, ECMx, and CP_start_time in accordance with various embodiments so that the encryptor and multiplexer unit 120 can perform the encryption using respective CWs and multiplexing with their respective ECMs in step 14.

In some embodiments, the watermark pace making, e.g., incrementing the WMID bit index in step 12, moves forward regardless of whether or not watermarks have been profiled and embedded by watermark inserter 114 during the current watermark cryptoperiod. In some other embodiments, as shown in FIG. 3, the watermark pace making is optional in step 12, e.g., interrupted or skipped if not enough watermarks have been profiled and embedded in the current watermark cryptoperiod. In other words, in some embodiments, the watermark inserter 114 described herein determines whether one or more parts for embedding the watermark symbols within the watermark cryptoperiod are more than a predefined threshold for watermark robustness. In accordance with a determination that the one or more parts are not more than the predefined threshold for watermark robustness, the watermark inserter 114 forgoes incrementing the watermark identifier symbol index for the next watermark cryptoperiod. For instance, the watermarking system described herein can require a given number of marks being present to guarantee watermark detection with an expected level of robustness, e.g., 100 marks as a predefined threshold for watermark robustness. In such embodiments, in step 12, the watermark inserter 114 waits for such condition to be satisfied prior to incrementing the WMID bit index for the next watermark cryptoperiod, thus making the WMID bit index incrementation optional in step 12 and not performing, e.g., forgoing incrementing the WMID bit index for the next watermark cryptoperiod when not identifying 100 marks in the one or more TPs for generating the auxiliary streams.

In some embodiments, the ECMGs 116-*w* and 116-*x* generate the ECMs 310 for the streams 30 and 40 with PIDw and PIDx as shown in FIG. 1 in such a way that client devices with a first symbol value (e.g., bit value 0) for a given WMID bit index can produce a CW for decrypting the stream 30 or 40, e.g., CWw for decrypting the stream 30 with PIDw and CWx for decrypting the stream 40 with PIDx. Further, in some embodiments, for synchronized interleaved watermarking, the watermark cryptoperiods for the streams with PIDw and PIDx are synchronized independently of the cryptoperiods for the video stream with PIDv. In FIG. 3, as indicated by the dashed lines between steps 3 and 4 and also between steps 14 and 15, the watermark cryptoperiods are synchronized through the interactions among the watermark inserter 114, the SCS 118, and the ECMGs 116-*w* and 116-*x*. In contrast, the provisioning of the CW for the video stream in step 15, e.g., CWv, and the ECM for the video stream by the ECMG-v 116-*v* in step 16, e.g., ECMv, followed by the signaling of the start of the cryptoperiod by the SCS 118 in step 17 are independent of the watermark cryptoperiods synchronization.

Figure 4:
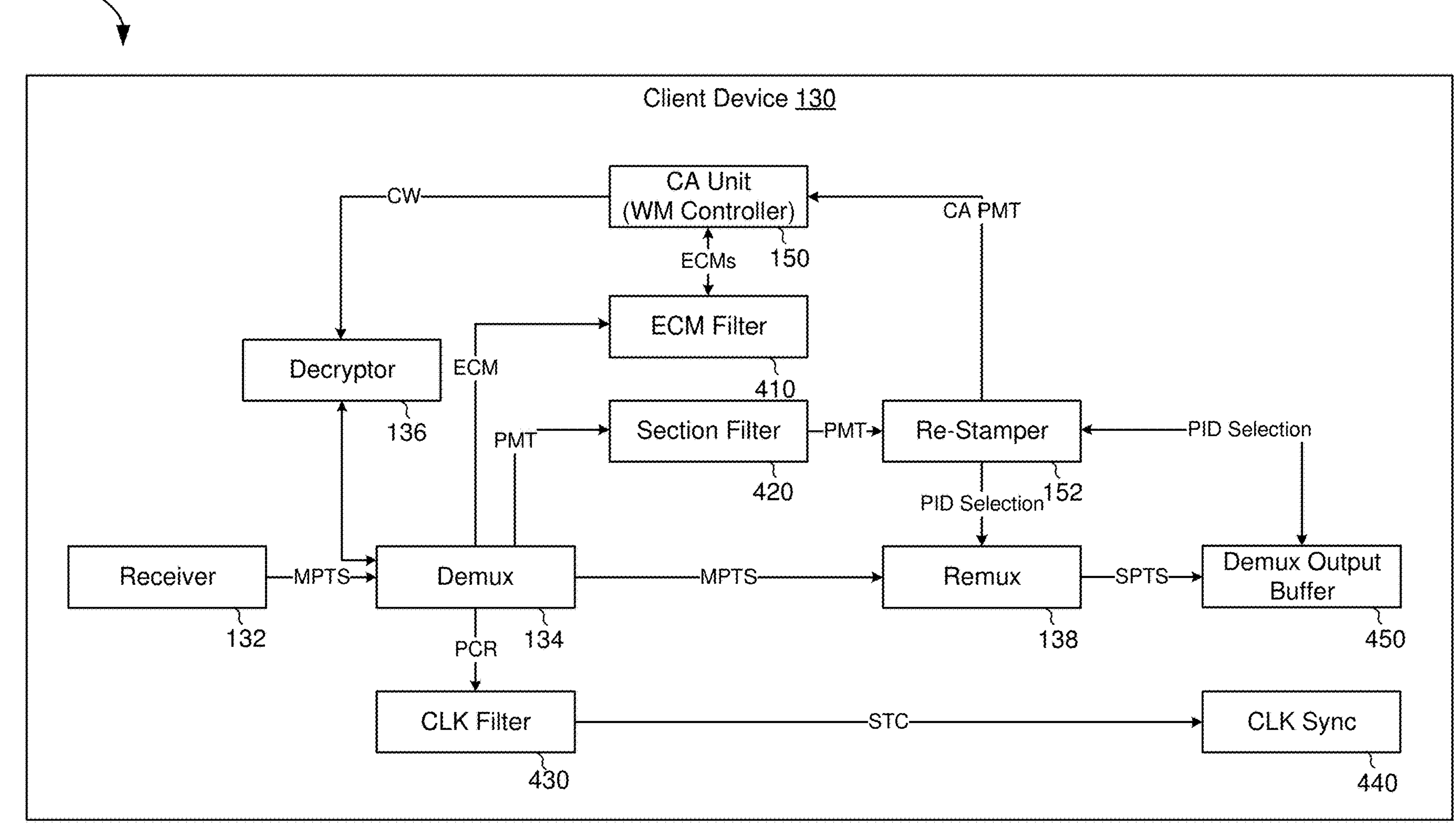
FIG. 4 is a block diagram illustrating an exemplary client device used in the exemplary multimedia content delivery system performing synchronized interleaved watermarking, in accordance with some embodiments.

FIG. 4 is a diagram 400 illustrating an embodiment of the client device 130 described above with reference to FIG. 2. As described above with reference to FIG. 2, in some embodiments, the demultiplexer 134 obtains a multiplexed stream from the receiver 132, where the multiplexed stream includes streams multiplexed by the encryptor and multiplexer 120) (FIGS. 1 and 2), e.g., the video stream 20 with PIDv, the audio stream 22, the stream 30 with PIDw, and the stream 40 with PIDx carrying watermarked sections shown in FIG. 1 and their respective ECMs. In some embodiments, the demultiplexer 134 is coupled with the decryptor 136, which is further coupled with the CA unit 150, so that CWs are obtained and used for decrypting the demultiplexed streams. In addition to demultiplexing the streams, the demultiplexer 134 also filters their respective ECMs. In some embodiments, to obtain the CWs, an ECM filter 410 receives the ECMs from the demultiplexer 134 and shares the ECMs with the CA unit 150. Further, a section filter 420 obtains a PMT from the demultiplexer 134 and shares the PMT information associated with PIDv, PIDw; and PIDx along with other PIDs associated with a program to a re-stamper 152. In some embodiments, the re-stamper 152 further shares the program information related to conditional access to the CA unit 150.

In some embodiments, to generate the composite stream 60) (FIG. 1), the re-stamper 152 re-stamps the PIDs of the decrypted packets from the auxiliary streams to the same PID as the video stream, e.g., re-stramping packets from PIDw or PIDx to PIDv. The re-stamping allows the assembly of the packets from the stream with PIDv with the watermarked packets from the auxiliary stream with PIDw or PIDx into a single stream, e.g., an SPTS. In some embodiments, the remaining packets in the streams with PIDw and PIDx are not re-stamped and are not processed downstream of the re-stamper 152 to save processing time. In some embodiments, the re-multiplexer 138 sends the re-assembled single stream to the demultiplexer output buffer 450 in preparation for decoding and rendering as will be described in further detail below with reference to FIGS. 5A and 5B. At the same time, the resulting streaming can be fed to a review buffer, and later fed to a decoder for time-shifted viewing, ensuring that watermarks are present for both live and review buffer playback.

In some embodiments, when re-stamping and re-multiplexing packets from multiple streams, the order of TPs in the multiplexed MPTS received by the client is preserved, e.g., by preserving the timestamps of the TPs. For example, in FIG. 1, the packets in the original content stream 10 are according to the order of $V_1$ followed by $A_1$, then $V_2$, $V_3$, $V_4$, $V_5$, and $V_6$, etc. The re-assembled single program transport stream (SPTS) 60 includes packets from PIDv, PIDa, and PIDw, e.g., $V_1$ followed by $A_1$, then $V_2$, $V_3'$, $V_4$, $V_5$, and $V_6$, etc. As such, these packets in the composite stream 60 for rendering are in the same order as in the original content stream 10, thus maintaining the order of presentation and/or decoding for rendering.

In some embodiments, a clock filter 430 is coupled with the demultiplexer 134 and obtains program clock reference (PCR) from the demultiplexer 134. The PCR can then be used by a clock synchronizer 440 for driving the system time clock (STC). The STC provided by the clock synchronizer 440 are then used by decoders for synchronizing video and audio data.

In some embodiments, at each watermark cryptoperiod boundary, the client device 130 identifies the next symbol of the client identifier and selects from either the stream with PIDw or the stream with PIDx based on the next symbol. During each watermark cryptoperiod, in some embodiments, a descrambler is set up according to the ECMs for the stream with PIDw or the stream with PIDx. At the same time, another descrambler is set up to continuously descramble PIDv. As such, the setup of the respective descrambler for the stream with the PIDw or the stream with the PIDx according to the watermark cryptoperiod is independent of the setup of a descrambler for the video stream with PIDw according to a different cryptoperiod. Moreover, in some embodiments, at any one time, there is a single descrambler configured for each watermark cryptoperiod, e.g., one for the stream with PIDw during the current watermark cryptoperiod in the case of the symbol of the client identifier is 0) and a different one for the stream with PIDx during the next watermark cryptoperiod in the case of the symbol of the client identifier is 1. This allows the delivery of one WMID symbol during each watermark cryptoperiod.

Figure 5A:
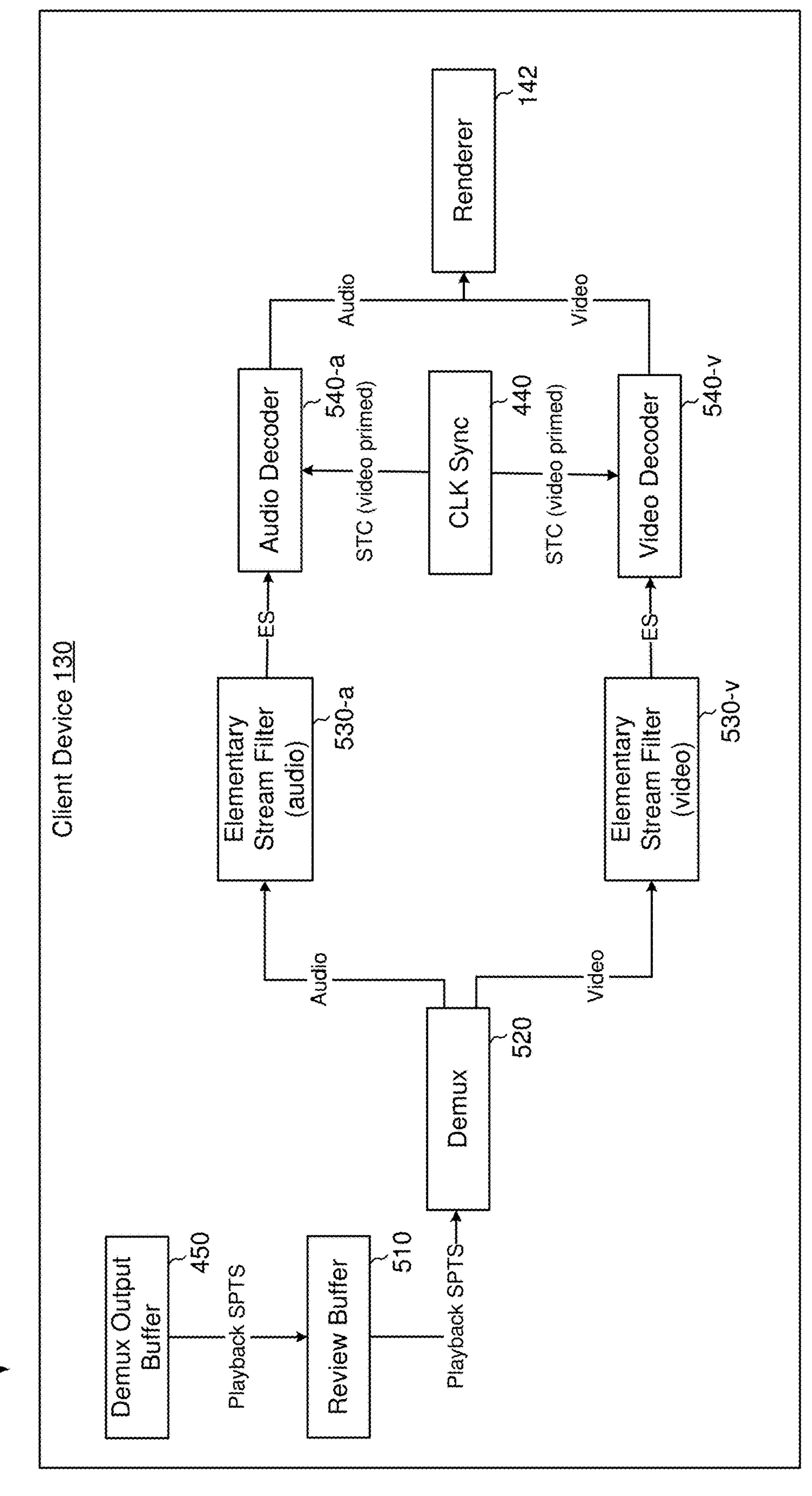
FIGS. 5A and 5B are block diagrams illustrating a play back pipeline and a live viewing pipeline on the exemplary client device, in accordance with some embodiments.
Figure 5B:
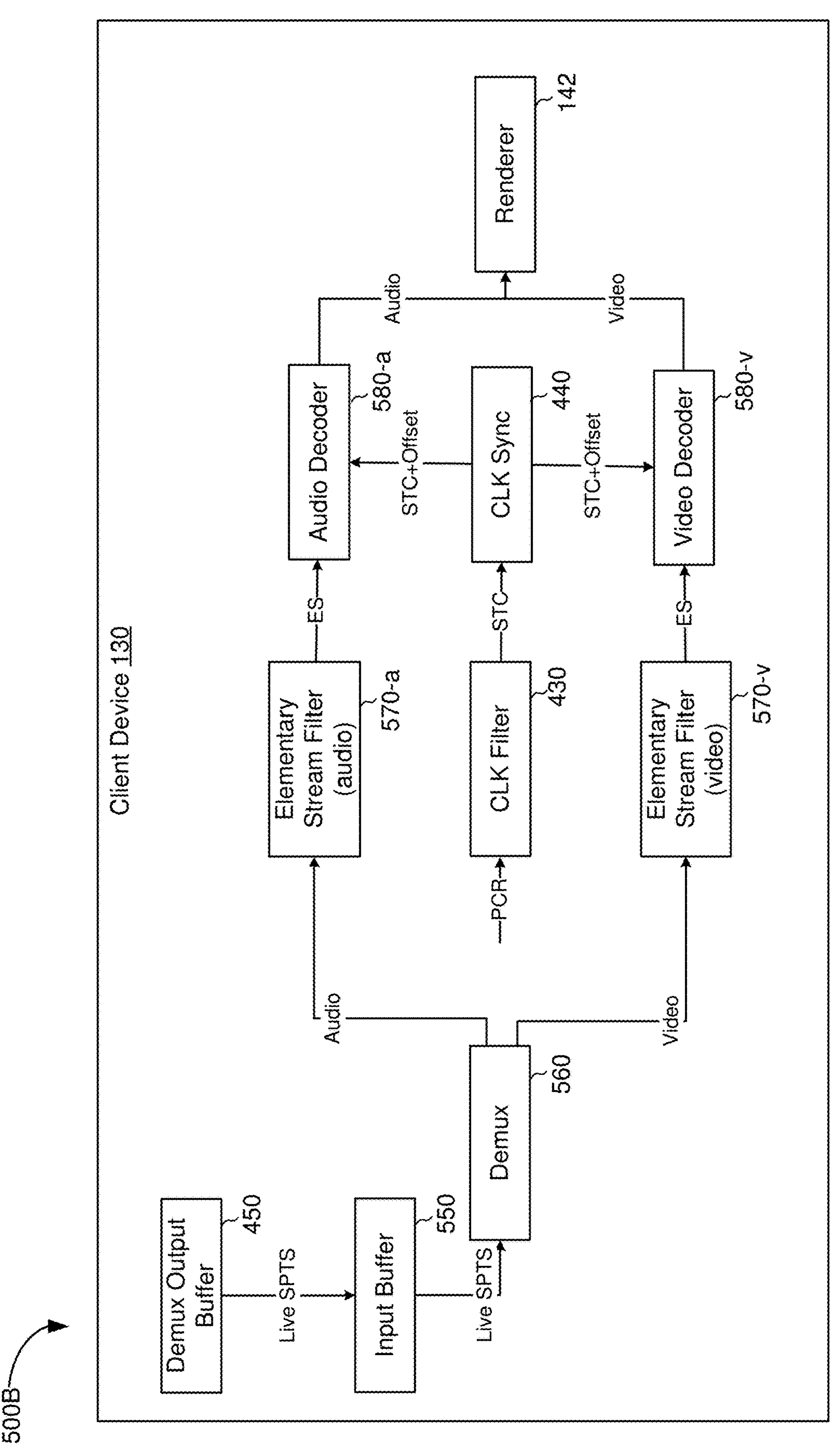

FIGS. 5A and 5B are diagrams 500A and 500B illustrating play back pipeline and live viewing pipeline in accordance with some embodiments. In FIG. 5A, the stream from the demultiplexer output buffer 450 is provided to a review buffer 510 (or a recording pipeline) for time-shifted viewing, e.g., during playback of recorded content for in-home streaming to a home network device. In some embodiments, the demultiplexer and decoder chain for playbacks includes a demultiplexer 520 that demultiplexes the SPTS into an audio stream and a video stream. In some embodiments, the demultiplexer 520 provides the demultiplexed audio stream to an elementary filter 530-*a* for deriving an audio elementary stream and provides the demultiplexed video stream to an elementary filter 530-*v* for deriving a video elementary stream. The audio and video streams are then sent to an audio decoder 540)-a and a video decoder 540-*v*, respectively, where the audio decoder 540)-a and the video decoder 540)-v are instances of the decoder(s) 140 in FIG. 1. When decoding the video and audio data, the decoders 540)-a and 540-*b* use STC from the clock synchronizer 440 for synchronization, where the time is primed for the video. The decoded audio data from the audio decoder 540-*a* and the decoded video data from the video decoder 540-*v* are then received by the renderer 142 for display.

Turning to FIG. 5B, as described above with reference to FIG. 4, because the stream from the demultiplexer output buffer 450 is provided simultaneously to both the playback pipeline shown in FIG. 5A and the live viewing pipeline shown in FIG. 5B, an input buffer 550 for the live viewing receives a live SPTS from the demultiplexer output buffer 450. Similar to the play back pipeline shown in FIG. 5A, in FIG. 5B, in some embodiments, the demultiplexer and decoder chain for live viewing, e.g., a decoding pipeline used for living viewing, includes a demultiplexer 560 that demultiplexes the live SPTS into an audio stream and a video stream. Also similar to the playback pipeline shown in FIG. 5A, in FIG. 5B, in some embodiments, the demultiplexer 560 provides the demultiplexed audio stream to an elementary filter 570-*a* for deriving an audio elementary stream and provides the demultiplexed video stream to an elementary filter 570-*v* for deriving a video elementary stream. The audio and video streams are then sent to the audio decoder 580-*a* and the video decoder 580-*v*, respectively.

Different from the playback pipeline shown in FIG. 5A, in FIG. 5B, the downstream decoders 580-*a* and 580-*v* are slaved to the clock synchronizer 440 described above with reference to FIG. 4, where the clock filter 430 coupled to the clock synchronizer 440 obtains the PCR from the demultiplexed video stream by the demultiplexer 134 (FIG. 4), uses the PCR to drive the STC, and provides the STC to the clock synchronizer 440. By slaving the decoders 580)-a and 580-*v* to the clock synchronizer 440, the demultiplexer and decoder chain for live viewing is synchronized using the STC derived from the main video PCR offset by the watermark processing delay. The application of the offset to the STC accounts for any delay introduced by the watermarking process on the client device 130.

It should be noted that the audio decoder 540-*a* in FIG. 5A and the audio decoder 580-*a* in FIG. 5B can be shared by the play back pipeline and the live viewing pipeline for cost savings in accordance with some embodiments. Likewise, the video decoder 540-*v* in FIG. 5A and the video decoder 580-*v* in FIG. 5B can be shared by the playback pipeline and the live viewing pipeline in accordance with some embodiments. Similarly, the demultiplexer 520 in FIG. 5A and the demultiplexer 560 in FIG. 5B can be shared by the playback pipeline and the live viewing pipeline in accordance with some embodiments. Alternatively, in accordance with various embodiments, each of the playback pipeline and the live viewing pipeline can have distinct and separate decoders and/or demultiplexers for simplicity.

As shown in FIGS. 4 and 5A-5B, on the client side of the synchronized interleaved system described herein, the client device 130 reconstitutes a valid stream using the WM symbols associated with the client ID. Moreover, the client device 130 uses the watermark embedded valid stream to feed both live viewing, e.g., the decoding pipeline used for live viewing as shown in FIG. 5B, and recording, e.g., the recording pipeline used for time-shifted viewing as shown in FIG. 5A, thereby mitigating an attack using time-shifted viewing. In some embodiments, the client device 130 applies the STC offset as described with reference to FIG. 5B to accommodate the delay involved in reconstituting the valid stream for embedding the watermark. The application of the STC offset in accordance with some embodiments reduces the risk of the decoder buffer underflow.

Figure 6:
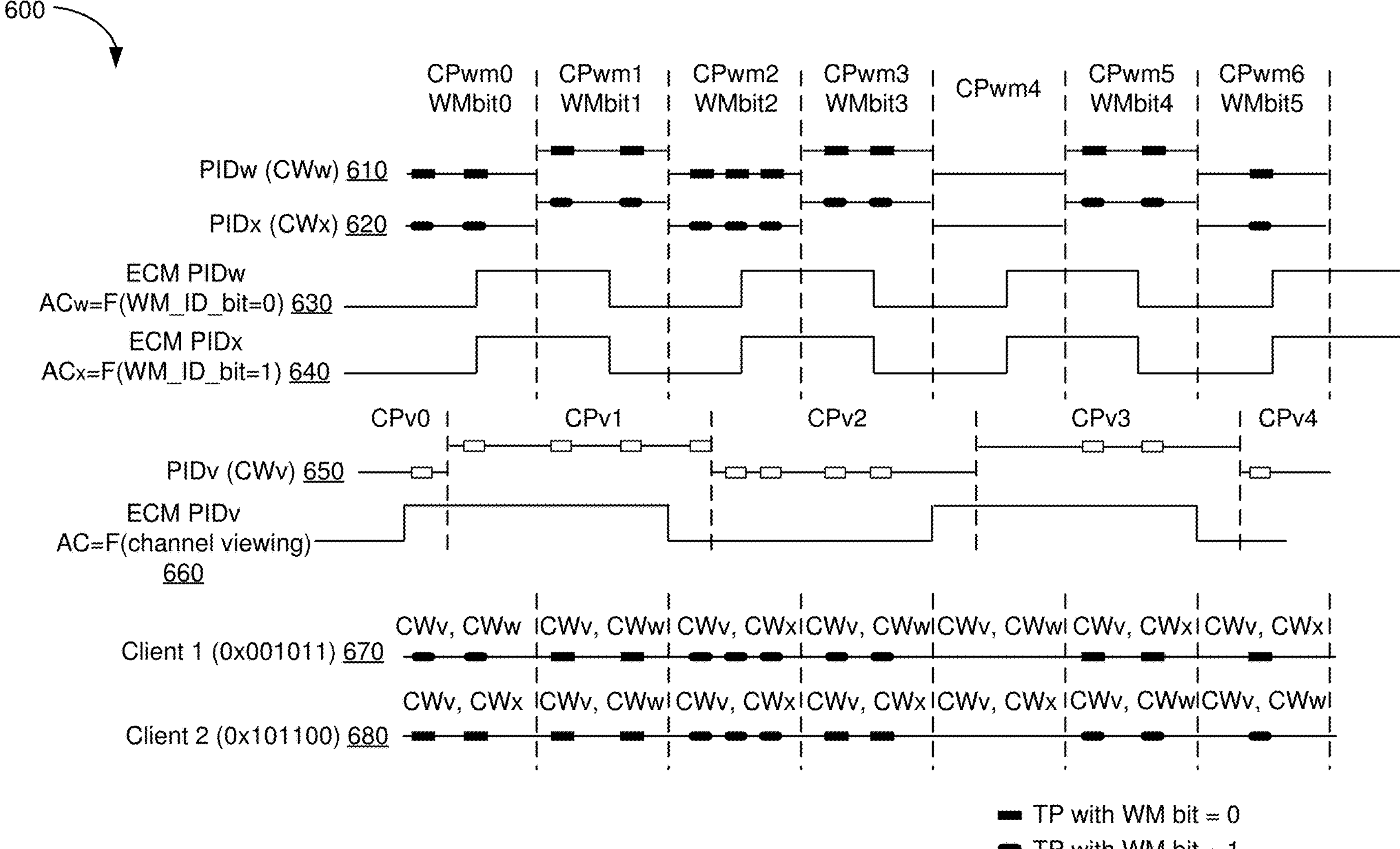
FIG. 6 is a diagram illustrating synchronization of auxiliary streams at the headend and re-multiplexing of the auxiliary streams at client devices, in accordance with some embodiments.

FIG. 6 is a diagram 600 illustrating synchronization of auxiliary streams at the headend and re-multiplexing of the auxiliary streams at client devices in accordance with some embodiments. In some embodiments, following the processes described above with reference to FIGS. 1-3, a first auxiliary stream 610 with PIDw, which would be encrypted with the control word CWw, is generated and includes TPs embedded with watermarks during watermark cryptoperiods CPwm0 through CPwm6. Similarly, a second auxiliary stream 620 with PIDw, which would be encrypted with the control word CWx, is generated and includes TPs embedded with watermarks during watermark cryptoperiods CPwm0 through CPwm6. In the example shown in FIG. 6, the first auxiliary stream 610 includes TPs with watermark bit value of 0 and the second auxiliary stream 620 includes TPs with watermark bit value of 1. In some embodiments, as described above with reference to FIGS. 1-3, the TPs in the first and the second auxiliary streams 610 and 620 are generated by removing the selected TPs from a video stream 650, as indicated by the empty boxes along the signaling line for the video stream 650, and duplicating the selected TPs before moving the duplicated TPs to the first auxiliary stream 610 or the second auxiliary stream 620 and embedding the respective watermark symbols.

For example, during the watermark cryptoperiod CPwm0, two TPs are generated by the watermark inserter 114 (FIGS. 2 and 3) with PIDw for WMID bit index 0, denoted as WMbit0 in FIG. 6. Similarly, for each of the watermark cryptoperiods CPwm1, CPwm3, and CPwm5, two TPs are generated with PIDw for WMID bit index 1 (denoted as WMbit0), WMID bit index 3 (denoted as WMbit3), and WMID bit index 4 (denoted as WMbit4), respectively. In another example, during the watermark cryptoperiod CPwm2, three TPs are generated by the watermark inserter 114 (FIGS. 2 and 3) with PIDw for WMID bit index 2, denoted as WMbit0 in FIG. 6. In yet another example, during the watermark cryptoperiod CPwm6, one TP is generated by the watermark inserter 114 (FIGS. 2 and 3) with PIDw for WMID bit index 5, denoted as WMbit5 in FIG. 6.

It should be noted that as described above with reference to FIG. 3, in steps 11 and 12 of FIG. 3, when profiling for watermarking opportunities, the watermark inserter 114 may decide to skip the current watermark cryptoperiod and not incrementing the WMID bit index. As shown in FIG. 6, during the watermark cryptoperiod CPwm4, no watermarking opportunities are present and the WMID bit index is not incremented until CPwm5, e.g., generating two TPs with PIDw for WMbit4 in CPwm5 and not generating any TPs with PIDw in CPwm4.

Still referring to FIG. 6, in some embodiments, the watermark cryptoperiods for the auxiliary streams 610 and 620 are synchronized, e.g., the boundaries of the watermark cryptoperiods for the stream 610 and the stream 620 are aligned. To signal the start of each watermark cryptoperiod, as described above with reference to FIG. 3, the watermark inserter, the SCS, and the ECMG communicate with each other so that the signaling of ECMs 630 and 640 for the auxiliary streams 610 and 620 with PIDw and PIDx coincides with the watermark cryptoperiods CPwm0 through CPwm6. On the other hand, as shown in FIG. 6, the watermark cryptoperiods CPwm0 through CPwm6 are independent of the cryptoperiods for the video stream 650 with PIDv that would be encrypted with a control word CWv and multiplexed with the auxiliary streams.

For example, in FIG. 6, the video stream 650 is encrypted with CWv according to cryptoperiods CPv0 through CPv4. The duration of each of the cryptoperiods CPv0 through CPv4 is different from the duration of each of the watermark cryptoperiods CPwm0 through CPwm6. As a result, the boundaries dividing the cryptoperiods CPv0 through CPv4 are not aligned with the boundaries dividing the watermark cryptoperiods CPwm0 through CPwm6. Consequently, the signaling of the ECMs for PIDv 660 is different from the synchronized ECMs for PIDw and PIDx 630 and 640.

When client devices 670 and 680 receive the multiplexed stream including PIDv, PIDw, and PIDx, the respective CA unit 150 (FIGS. 2 and 4) on the client devices 670 and 680 selects TPs from the auxiliary streams with PIDw and PIDx during each watermark cryptoperiod according to the respective client ID. For example, the first client device 670 has a client ID value of 0x001011. During the first watermark cryptoperiod CPwm0, because the first bit of the client ID value 0x001011 is 0, the two TPs from the first auxiliary stream 610 with PIDw is selected to be multiplexed with the packets from the video stream 650. Accordingly, the CA unit 150 provides CWw to the decryptor 136 for decrypting these two TPs from the first auxiliary stream 610. In some embodiments, the CA unit 150 also provides CWv to the decryptor 136 for decrypting the TPs from the video stream 650. Further, in some embodiments, the re-stamper 152 re-stamps these two TPs to PIDv so that the two TPs from the first auxiliary stream 610 with watermark embedded can be re-multiplexed with the TPs from the video stream 650 to form an SPTS. In another example, the second client device 680) has a client ID value of 0x101100. During the first watermark cryptoperiod CPwm0, because the first bit of the client ID value 0x001011 is 1, the two TPs from the second auxiliary stream 620 with PIDx is selected to be multiplexed with the packets from the video stream 650. Accordingly, the CA unit 150 provides CWx to the decryptor 136 for decrypting these two TPs from the second auxiliary stream 620, and the re-stamper 152 re-stamps these two TPs to PIDv so that the two TPs from the second auxiliary stream 620 with watermark embedded can be re-multiplexed with the TPs from the video stream 650 to form an SPTS.

In FIG. 6, the watermark cryptoperiod CPwm4 does not have watermarking. As described above with reference to FIG. 1, interleaved watermarking can be adapted to cryptoperiods without watermarking for tamper protection. Though not shown in FIG. 6, in some embodiments, certain parts from the video stream 650 that are essential for viewing, e.g., one or more video packets carrying portion(s) of I-frame, are moved from the video stream 650 to both auxiliary streams 610 and 620 without embedding any of the watermark symbols. In some embodiments, the parts that are moved to the auxiliary streams 610 and 620 are encrypted using ECM(s) generated by the ECMG(s) in the next watermark cryptoperiod. In such embodiments, the watermark inserter selects PIDw or PIDx and notifies the ECMG about the selection of PIDw or PIDx for CPwm4, so that the ECM signaling the production or generation of CWw is provided to the first client device 670 for decryption in the next watermark cryptoperiod. Similarly, in some embodiments, the ECM signaling the production of CWx is provided to the second client device 680 for decryption. Because the stream 650) alone cannot be used for rendering an output, moving certain TPs from the video stream 650 to the auxiliary streams 610 and 620 enforces the client to employ both of the auxiliary streams 610 and 620 when re-assembling the composite stream for rendering, thus preventing an attack on the client during the watermark cryptoperiod CPwm4 when no TPs with watermarks are embedded.

Figure 7:
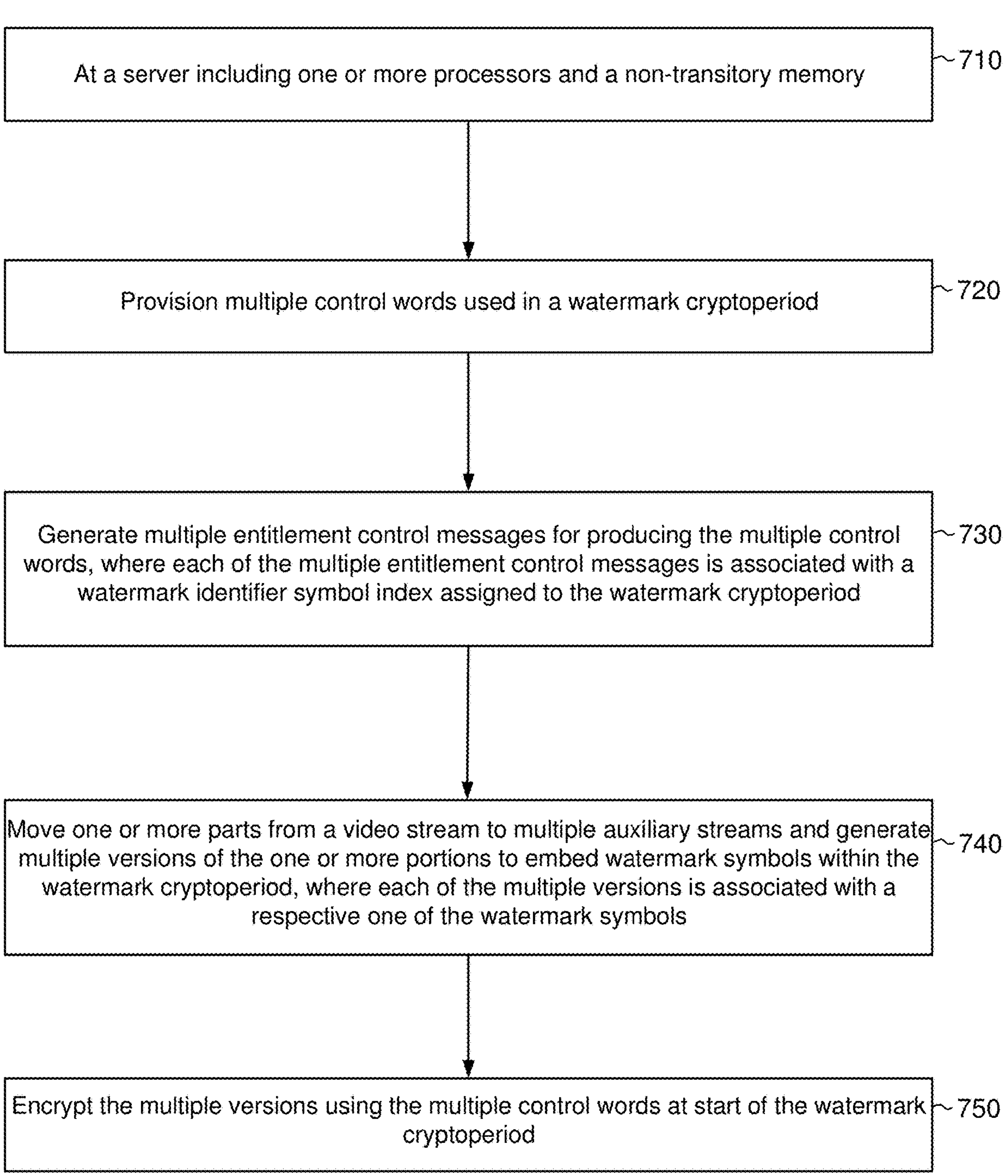
FIG. 7 is a flowchart illustrating a method for synchronized interleaved watermarking on the server side, in accordance with some embodiments.

FIG. 7 is a flowchart illustrating a method 700 for synchronized interleaved watermarking on the server side in accordance with some embodiments. In some embodiments, as represented by block 710, the method 700 is performed at a server, e.g., a server hosting the headend 110 in FIG. 2. In some embodiments, the server includes one or more processors and a non-transitory memory. As represented by block 720, the method 700 begins with the server provisioning multiple control words used in a watermark cryptoperiod. For example, in steps 4 and 5 of FIG. 3, the SCS 118 sends control provisioning messages to the ECMGs 116-*w* and 116-*x* to provision the control words CWw and CWx for a watermark cryptoperiod.

As represented by block 730, the method 700 continues with the server generating multiple entitlement control messages for producing the multiple control words, wherein each of the multiple entitlement control messages is associated with a watermark identifier symbol index assigned to the watermark cryptoperiod. For example, in FIG. 3, the ECMG-w: 116-*w* and the ECMG-x 116-*x* generates the ECMs 310 for the streams with PIDw and PIDx in such a way that client devices with one symbol value (e.g., bit value 0) for a given WMID symbol index can produce CWw for the stream with PIDw and client devices with a different symbol value (e.g., bit value 1) for a given WMID symbol index can produce CWx for the stream with PIDx. The watermark identifier symbol index is cascaded to the client devices through the ECMs so that the demultiplexing performed on the client side is aligned with the watermark inserter pace making on the server side.

As represented by block 740, the method 700 continues with the server moving one or more portions from a video stream to multiple auxiliary streams and generating multiple versions of the one or more portions to embed watermark symbols within the watermark cryptoperiod, where each of the multiple versions is associated with a respective one of the watermark symbols. For example, as shown in FIG. 1, the packet $V_3$ carrying video data is moved and multiple versions $V_3'$ and $V_3''$ in the auxiliary streams 30 and 40 are created by first duplicating the packet $V_3$ and then embedding watermark symbols into the duplicated packets, where the packet $V_3'$ in the stream 30 with PIDw is embedded with one value of a watermark symbol, e.g., bit value of 0 and the packet $V_3''$ in the stream 40) is embedded with another value of the watermark symbol, e.g., bit value of 1. Also as shown in FIG. 6, in the first watermark cryptoperiod, two portions are removed from the stream with PIDv and moved to the auxiliary streams 630 and 640 with one version in the stream 630 with PIDw being associated with watermark bit value of 0 and the other version in the stream 640 with PIDx being associated with watermark bit value of 1.

As represented by block 750, the method 700 continues with the server encrypting the multiple versions using the multiple control words at start of the watermark cryptoperiod. For example, in step 13 of FIG. 3, when the watermark cryptoperiod starts, e.g., at CP_start_time, the control words CWw and CWx along with the entitlement control messages ECMw and ECMx are communicated to the encryptor and multiplexer unit 120 for encryption of the auxiliary streams. The encrypted auxiliary streams, along with the ECMs in some embodiments, are then multiplexed by the multiplexer with the video stream for transmission as shown in step 14 of FIG. 3.

Figure 8:
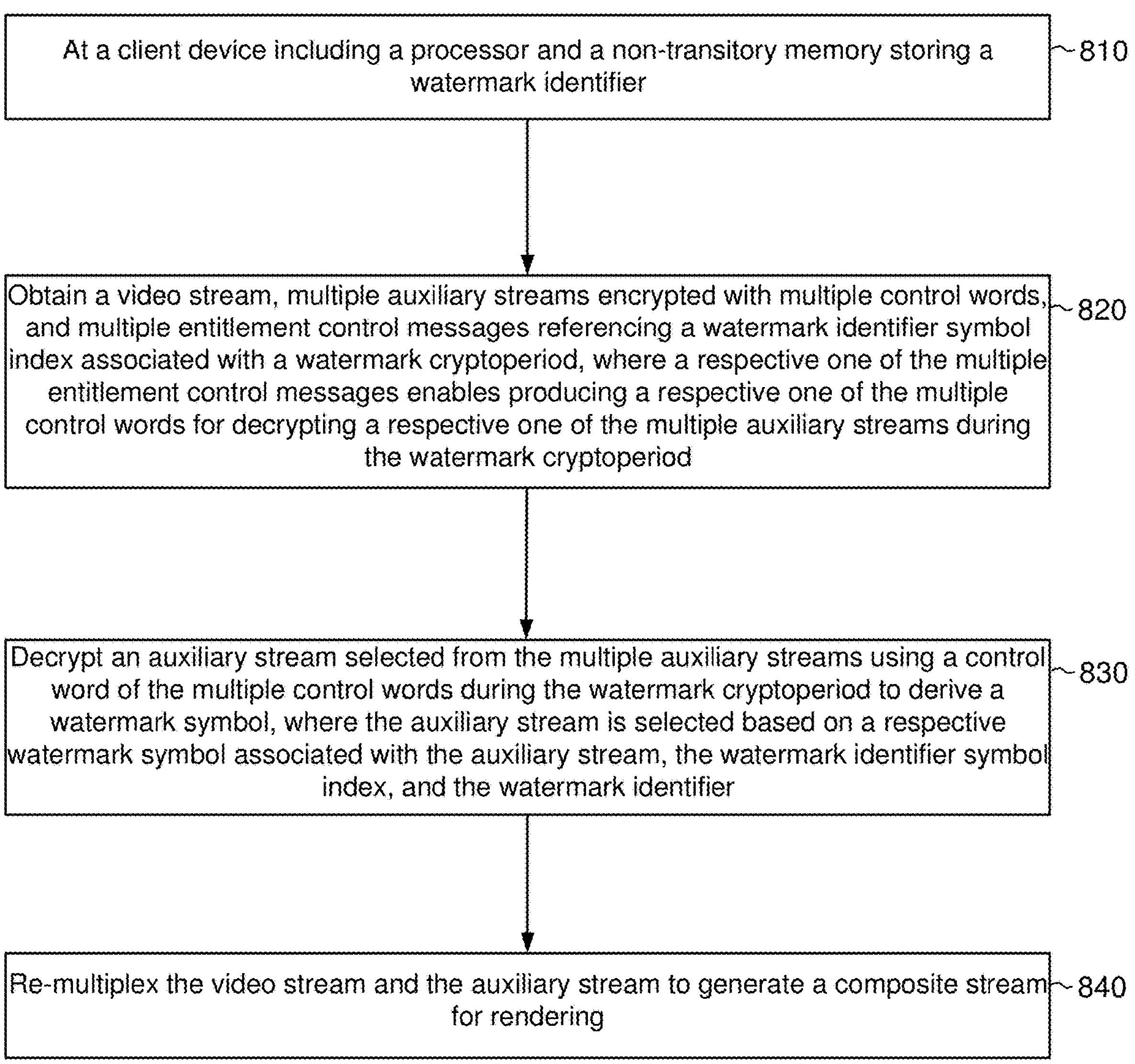
FIG. 8 is a flowchart illustrating a method for decrypting and re-multiplexing interleaved watermarked streams on the client side, in accordance with some embodiments.

FIG. 8 is a flowchart illustrating a method 800 for decrypting and re-multiplexing interleaved watermarked streams at the client side in accordance with some embodiments. In some embodiments, as represented by block 810, the method 800 is performed at a client device, e.g., the client device 130 in FIG. 2. In some embodiments, the client device includes a processor and a non-transitory memory that stores a watermark identifier (e.g., a client ID). As represented by block 820, the method 800 begins with the client device obtaining a video stream, multiple auxiliary streams encrypted with multiple control words, and multiple entitlement control messages referencing a watermark identifier symbol index associated with a watermark cryptoperiod, where a respective one of the multiple entitlement control messages enables producing a respective one of the multiple control words for decrypting a respective one of the multiple auxiliary streams during the watermark cryptoperiod. As represented by block 830, the method 800 continues with the client device decrypting an auxiliary stream selected from the multiple auxiliary streams using a control word of the multiple control words during the watermark cryptoperiod, wherein the auxiliary stream is selected based on a respective watermark symbol associated with the auxiliary stream, the watermark identifier symbol index, and the watermark identifier.

For example, in FIG. 4, the receiver 132 receives and demodulates the signal carrying the MPTS 52 shown in FIG. 1, which includes packets carrying the multiplexed video stream and auxiliary streams along with signaling such as PMT and ECMs 310 (FIG. 3). Also as shown in FIG. 4, the demultiplexer 134 obtains the demodulated MPTS from the receiver 132 and coordinates with the ECM filter 410, and the CA unit 150 to generate ECMs for producing CWs, which are then used by the decryptor 136 to decrypt the auxiliary streams. As described above with reference to FIG. 3, the ECMs 310 reference the watermark identifier symbol index associated with a watermark cryptoperiod and communicate the watermark identifier symbol index to the client device so that the client device can selectively decrypt the auxiliary streams, e.g., selecting the auxiliary stream that corresponds to the value of the symbol of the indexed WMID in a corresponding watermark cryptoperiod.

As represented by block 840, the method 800 continues with the client device re-multiplexing the video stream and the auxiliary stream to generate a composite stream for rendering. For example, in FIG. 4, the re-multiplexer 130 recombines the packets to generate the composite stream 60 shown in FIG. 1 to feed both the live viewing pipeline shown in FIG. 5B and the review buffer recording pipeline shown in FIG. 5A. Because the composite stream includes the watermark embedded packets and the PCR from the video stream is used as STC, circumvention of watermarks by time-shifting can be prevented.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at a server including one or more processors and a non-transitory memory:

provisioning multiple control words used in a watermark cryptoperiod, including specifying to multiple entitlement control message generators (ECMGs) watermark cryptoperiod information of the watermark cryptoperiod, and causing the multiple ECMGs to notify a watermark inserter the watermark cryptoperiod information, wherein a cryptoperiod for encrypting a video stream is different from the watermark cryptoperiod for watermark embedding in multiple auxiliary streams associated with the video stream;

assigning, by the watermark inserter, a watermark identifier symbol index to the watermark cryptoperiod in response to receiving the notification of the watermark cryptoperiod information and signaling the watermark identifier symbol index to the ECMGs;

generating, by the multiple ECMGs, multiple entitlement control messages for producing the multiple control words, including associating each of the multiple entitlement control messages with the watermark identifier symbol index;

moving, by the watermark inserter, one or more portions from the video stream to the multiple auxiliary streams and generating, by the watermark inserter, multiple versions of the one or more portions to embed watermark symbols within the watermark cryptoperiod, wherein each of the multiple versions is associated with a respective one of the watermark symbols; and encrypting, upon receiving signaling of start of the watermark cryptoperiod according to the watermark cryptoperiod information, the multiple versions using the multiple control words at the start of the watermark cryptoperiod.

2. The method of claim 1, wherein the multiple entitlement control messages are synchronized according to the watermark cryptoperiod, independent of the cryptoperiod associated with the video stream.

3. The method of claim 1, wherein the watermark identifier symbol index is calculated based on one or more of a start time of the watermark cryptoperiod, a duration of the watermark cryptoperiod, and a length of the watermark symbols.

4. The method of claim 1, wherein the one or more portions correspond to one or more transport packets, one or more bytes, or one or more seconds.

5. The method of claim 1, wherein moving the one or more portions from the video stream to the multiple auxiliary streams and generating the multiple versions of the one or more portions to embed the watermark symbols within the watermark cryptoperiod includes:

profiling the video stream to identify one or more portions for applying the watermark symbols;

generating watermark metadata for encoding the watermark symbols in the one or more portions; and generating the multiple versions of the one or more portions by duplicating the one or more portions from the video stream and applying the respective one of the watermark symbols to a respective one of the multiple versions according to the watermark metadata.

6. The method of claim 1, further comprising:

encrypting the video stream according to the cryptoperiod, independent of the watermark cryptoperiod; and multiplexing the encrypted multiple auxiliary streams and the encrypted video stream along with the multiple entitlement control messages for transmission.

7. The method of claim 1, further comprising:

incrementing the watermark identifier symbol index assigned to a next watermark cryptoperiod.

8. The method of claim 1, further comprising:

determining whether the one or more portions for embedding the watermark symbols within the watermark cryptoperiod are more than a predefined threshold for watermark robustness; and in accordance with a determination that the one or more portions are not more than the predefined threshold for watermark robustness, forgoing incrementing the watermark identifier symbol index for a next watermark cryptoperiod.

9. The method of claim 1, further comprising:

moving a part from a next portion of the video stream to the multiple auxiliary streams without embedding any of the watermark symbols;

generating an entitlement control message for producing a control word used in a next watermark cryptoperiod; and encrypting the part in the multiple auxiliary streams using the entitlement control message in the next watermark cryptoperiod.

10. A server comprising:

one or more processors;

a non-transitory memory; and one or more programs stored in the non-transitory memory, which, when executed by the one or more processors, cause the server to:

provision multiple control words used in a watermark cryptoperiod, including specifying to multiple entitlement control message generators (ECMGs) watermark cryptoperiod information of the watermark cryptoperiod, and causing the multiple ECMGs to notify a watermark inserter the watermark cryptoperiod information, wherein a cryptoperiod for encrypting a video stream is different from the watermark cryptoperiod for watermark embedding in multiple auxiliary streams associated with the video stream;

assign, by the watermark inserter, a watermark identifier symbol index to the watermark cryptoperiod in response to receiving the notification of the watermark cryptoperiod information and signal the watermark identifier symbol index to the ECMGs;

generate, by the multiple ECMGs, multiple entitlement control messages for producing the multiple control words, including associating each of the multiple entitlement control messages with the watermark identifier symbol index;

move, by the watermark inserter, one or more portions from the video stream to the multiple auxiliary streams and generate, by the watermark inserter, multiple versions of the one or more portions to embed watermark symbols within the watermark cryptoperiod, wherein each of the multiple versions is associated with a respective one of the watermark symbols; and encrypt, upon receiving signaling of start of the watermark cryptoperiod according to the watermark cryptoperiod information, the multiple versions using the multiple control words at the start of the watermark cryptoperiod.

11. The server of claim 10, wherein the multiple entitlement control messages are synchronized according to the watermark cryptoperiod, independent of the cryptoperiod associated with the video stream.

12. The server of claim 10, wherein the watermark identifier symbol index is calculated based on one or more of a start time of the watermark cryptoperiod, a duration of the watermark cryptoperiod, and a length of the watermark symbols.

* * * * *